United States Patent [19]

Tokuhisa et al.

[11] 4,436,562
[45] Mar. 13, 1984

[54] BASIC BONDED FLUXES FOR SUBMERGED ARC WELDING HAVING AN EXCELLENT REMOVABILITY OF SLAG AT A NARROW GROOVE

[75] Inventors: Masaaki Tokuhisa; Yukio Hirai, both of Chiba, Japan

[73] Assignee: Kawasaki Steel Corporation, Kobe, Japan

[21] Appl. No.: 335,888

[22] Filed: Dec. 30, 1981

[30] Foreign Application Priority Data

Jun. 5, 1981 [JP] Japan ................................. 56-85614

[51] Int. Cl.$^3$ .............................................. B23K 35/34
[52] U.S. Cl. ........................................ 148/24; 148/26
[58] Field of Search ................................... 148/24, 26

[56] References Cited

U.S. PATENT DOCUMENTS 3,184,345  5/1965  Kerekes ................................. 148/26
3,959,031  5/1976  More ..................................... 148/26

Primary Examiner—Peter D. Rosenberg

Attorney, Agent, or Firm—Balogh, Osann, Kramer, Dvorak, Genova & Traub

[57] ABSTRACT

Basic bonded fluxes for submerged arc welding consisting of a mixture of a slag forming composition, a gas forming composition and metal powders, in which a volume contraction of the weld slag is remarkable in the cooling process after the solidification of the weld slag and the removal of slag in the groove is easy, contain 5 to 20% by weight of BaO, not more than 10% by weight of CaO, 20 to 50% by weight of MgO, 6 to 25% by weight of SiO$_2$, 3 to 15% by weight of Al$_2$O$_3$ and 7 to 18% by weight of CaF$_2$ as the slag forming composition, a value of basicity shown by a ratio of the basic component and the acidic component being 2.3 to 4.5, the above described contents of BaO, CaO and MgO including amounts corresponding to the values obtained by calculating an amount of carbonates of these metals which are incorporated as the gas forming composition, as oxides and further contain 10 to 60% by weight of metal carbonates as the gas forming composition.

2 Claims, 7 Drawing Figures

BASIC BONDED FLUXES FOR SUBMERGED ARC WELDING HAVING AN EXCELLENT REMOVABILITY OF SLAG AT A NARROW GROOVE

BACKGROUND OF THE INVENTION

The present invention relates to basic bonded fluxes for submerged arc welding in which slags are easily removed at a narrow groove and aims to improve the removability of slags when a narrow groove in steel plates having a particularly large thickness is deposited by submerged arc welding process through one pass-one layer technique and to stabilize a molten metal flow movement in the weld puddle to prevent the formation of the welding defect and increase the qualities of the weld joint.

Figure 1:
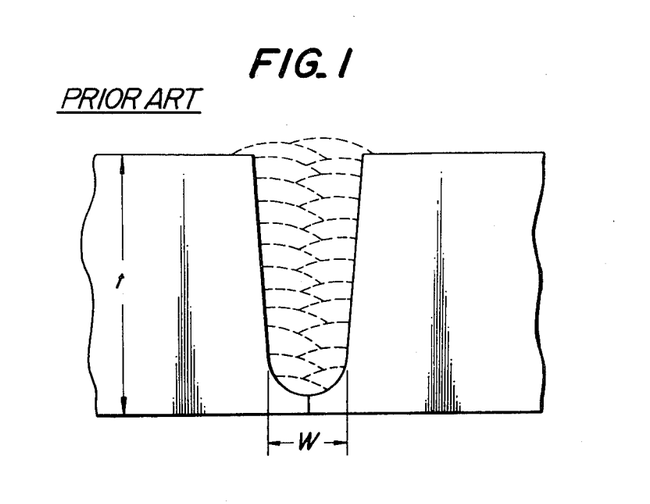
FIG. 1 is a cross-sectional view showing a groove configuration and a weld sequence of a prior art.

As a highly reliable welding process for steel materials having a very large thickness, such as off-shore structures, nuclear reactors, pressure vessels and the like, submerged arc welding has been generally advantageously used and a prior embodiment of a weld joint configuration and welding sequence is shown in FIG. 1 and in general, a width W of bottom of a groove is about more than 25 mm and the bead is deposited in multi-layers with two or more passes.

The reason why such a broad groove is adopted is that it is difficult to remove slags formed at every pass in a narrow groove where the distance of the groove is small and the removability of the slags is noticeably deteriorated to cause problems in the welding workability and further the welding defects, such as slag inclusion and lack of fusion are readily caused.

For a conventional broad groove, a number of welding pass is noticeably increased particularly in heavy plates having a larger thickness than 50 mm and therefore a large amount of welding materials and a long arc time are required and the efficiency becomes very poor.

In general, the welding fluxes are classified into acidic fluxes and basic fluxes.

When acidic fluxes are used, the oxygen content of weld metal is very high and therefore it is difficult to obtain excellent toughness and since a large amount of diffusible hydrogen is contained in the weld metal, hydrogen cracks are induced in welded joints having a heavy thickness.

On the other hand, oxygen and diffusible hydrogen levels in the weld metal in the case of basic fluxes may be lower than those in the case of acidic fluxes and the basic fluxes are effective for the improvement of the joint qualities. However, a basic weld slag has generally crystalline structure which is strong and is hardly crushed and the operation for removing the weld slag is very difficult.

The applicant has already proposed in Japanese Patent Application No. 164,692/79 that the removability of the slag is effectively improved by selecting the composition of a flux which mainly forms crystals of periclase (MgO) and barium mica (BaMg$_3$Al$_2$Si$_2$O$_{10}$F$_2$) in the slag after welding.

Figure 2:
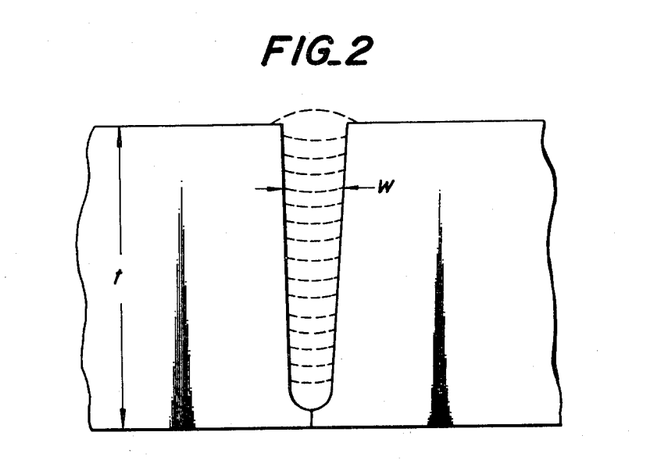
FIG. 2 is a schematic view for illustrating a narrow gap groove configuration and a weld sequence, to which the flux of the present invention can be applied.

When a groove having a narrow gap is subjected to the submerged arc welding through one pass-one layer technique as shown in FIG. 2 by using the above described flux, it has been necessary to cause a moderate arc blow by severely controlling a height of a flux dispersed to 45±5 mm in order to form a concaved weld bead surface and the control of the welding conditions have become troublesome. Thus, the inventors have in detail observed and checked the phenomenon of a molten pool by using a X-ray image amplifier apparatus concerning this cause and as the result it has been found that when welding defects, such as inadequate bead surface, undercut and slag inclusion and the like are formed, the flow of molten metal in the weld puddle is very unstable and that since the structure of the weld slag is crystalline, the slag wedged in the undercut is hardly crushed to facilitate its removal.

SUMMARY OF THE INVENTION

Thus, the inventors have made various investigations in order to overcome the above described problems in the narrow gap submerged arc welding with respect to the flux composition by which the molten metal's flow in the weld puddle is stabilized and the formation of welding defects is forestalled and in which the weld slag is easily crushed and the removability of slag is excellent. It has been found that in the flux composition which forms crystals of periclase (MgO) and barium mica (BaMg$_3$Al$_2$Si$_2$O$_{10}$F$_2$) in the weld slag, when the flux consists of not more than 10% by weight of CaO, 10 to 60% by weight of metal carbonates and 7 to 18% by weight of CaF$_2$ and has a basicity of 2.3 to 4.5, which is shown by a ratio of the basic component to the acidic component $$BL = \frac{MgO + BaO + CaO + CaF_2}{SiO_2 + Al_2O_3 + TiO_2 + MnO + ZrO_2},$$

the molten metal's flow in the weld puddle is stabilized, the formation of the welding defects is noticeably suppressed, and since the weld slag does not cause the volume expansion in the cooling process after solidification of the weld slag and in addition the fragile slag is generated, the removing operation is far more easy than the prior arts.

These fluxes are highly basic and contain a large amount of metal carbonates, so that oxygen and diffusible hydrogen in the weld metal are in very low levels, and these fluxes are effective for improving the mechanical properties and cold cracking sensitivity.

The present invention lies in basic bonded fluxes for submerged arc welding consisting of a mixture of a slag forming composition, a gas forming composition and metal powders, in which a thermal contraction of the weld slag is remarkable in the cooling process after the solidification of the weld slag and the removal of slag in the narrow groove is easy, characterized in that said slag forming composition consists mainly of 5 to 20% by weight of BaO, not more than 10% by weight of CaO, 20 to 50% by weight of MgO, 6 to 25% by weight of SiO$_2$, 3 to 15% by weight of Al$_2$O$_3$ and 7 to 18% by weight of CaF$_2$, a value of basicity shown by a ratio of the basic components and the acidic components being 2.3 to 4.5, and that an amount of the gas forming composition is 10 to 60% by weight of metal carbonates.

In the present invention, the content of BaO, CaO and MgO among the slag forming components includes an amount corresponding to the values obtained by calculating carbonates of these metals which are incorporated as the gas forming composition, as oxides and in particular, the metal carbonates are 10 to 60% by weight, BaCO$_3$ is 8 to 25% by weight, CaCO$_3$ is 2 to 15% by weight and a total amount of at least one of Li$_2$CO$_3$, Na$_2$CO$_3$, MnCO$_3$ and MgCO$_3$ is 4 to 15% by weight. When the fluxes of the present invention contain metal powders, the amount is not more than 20% by weight.

In the present invention, the weld slag composed of crystals of periclase (MgO) and barium mica (BaMg$_3$Al$_2$Si$_2$O$_{10}$F$_2$) does cause little volume expansion but shows the remarkable volume contraction and is easily removed, so that the present invention can be usefully applied to multi-layer submerged arc welding through one pass-one layer technique at a narrow groove having a root gap of less than 25 mm.

According to the fluxes of the present invention, the removability of slag is excellent and the flow of molten metal in the weld puddle is stabilized during welding, so that the defects of undercut, slag inclusion and the like are not caused and even in the groove of thick steel plates a root gap is less than 25 mm as shown in FIG. 2, weld joint can be built up by only one pass per one layer technique up to about 150 mm in thickness and the required pass number can be reduced to $\frac{1}{3}$ to $\frac{1}{2}$ as compared with the prior art and the welding materials, labor cost, and the electric energy can be greatly saved.

An explanation will be made hereinafter with respect to the function of each component of the fluxes preferred to carry out the present invention and to the selection of the component range.

MgO is the main component of periclase and barium mica which are useful as the crystals in the weld slag and the content of 20 to 50% by weight is necessary in view of insurance of the excellent removability of slag. When MgO is less than 20% by weight, the formation of the above described crystals in the weld slag is insufficient and the removability of slag in the narrow groove is considerably deteriorated. On the other hand, when MgO exceeds 50% by weight, the removability of slag is not influenced but the melting point of the slag is excessively raised and therefore the bead configuration becomes inferior and the side wall fusion becomes irregular and lack of fusion and slag inclusion are caused. As MgO source, other than magnesia clinker MgO, magnesite MgCO$_3$, dolomite MgCO$_3$.CaCO$_3$ and the like may be used in an amount calculated as MgO within the below described limited range.

BaO is the main component to form barium mica crystal in the weld slag and contributes to the improvement of the removability of slag owing to coexistence with periclase. For the purpose, it is necessary to contain 5 to 20% by weight of BaO.

When BaO is less than 5% by weight, barium mica crystal is not sufficiently formed and the effect for improving the removability of slag is not realized. When BaO exceeds 20% by weight, the ripple pattern of the weld bead becomes rough and fine slag flakes are liable to be remained on the bead surface and the bead appearance is deteriorated. As BaO source in this case, barium carbonate, barium oxide and the like are used and concerning BaCO$_3$, it is added in am amount calculated as BaO.

An upper limit of amount of CaO added is controlled in view of easy crushing of the weld slag including periclase and barium mica crystals. That is, when CaO exceeds 10% by weight, the weld slag becomes such a hard slag that is solidified with one kind of cement and the removability of slag becomes poor and in particular, when the undercut is caused owing to inadequate welding conditions or erroneous electrode working position, a large amount of labor time is needed for removal of the slag in this undercut portion. As CaO source in this case, mention may be made of wollastonite, calcium carbonate, dolomite and the like and these substances are added in an amount calculated as CaO with respect to CaCO$_3$.

SiO$_2$ needs the addition of 6 to 25% by weight for formation of barium mica as in MgO and BaO and in an amount of less than 6% by weight, barium mica is not sufficiently formed and the removability of slag is inferior and when the amount exceeds 25% by weight, the ripple pattern of the bead becomes rough and the slag is wedged at the ripple valley and the removability of slag is deteriorated.

Al$_2$O$_3$ is an element of composing barium mica and should be contained in an amount of 3 to 15% by weight in the flux. When the amount is less than 3% by weight, barium mica crystal is not satisfactorily formed and when the amount exceeds 15% by weight, a large amount of free alumina (Al$_2$O$_3$) crystal is formed. Accordingly, in both cases, the removability of slag is considerably deteriorated.

Metal carbonates decompose and generate CO$_2$ gas owing to the welding heat and prevent the entrance of nitrogen into weld puddle and reduce the hydrogen partial pressure in the arc atmosphere to decrease an amount of diffusible hydrogen in the weld metal. The more advantageous feature due to the addition of carbonates is that the molten metal's flow in the weld puddle is stabilized and the concaved bead configuration is obtained and then the formation of undercut and slag inclusion is noticeably suppressed. When an amount of metal carbonates is less than 10% by weight, the molten metal flow is unstable and weld defects such as undercut and slag inclusion are apt to occur and an amount of diffusible hydrogen in the weld metal is increased and the hydrogen cracks may be induced. When the amount exceeds 60% by weight, the evolution of CO$_2$ becomes excessive and a strong gas flow is generated in arc cave and the molten metal flow is considerably disturbed and thereby the undercut and slag inclusion are formed.

In this case, the optimum amounts of metal carbonates added are 8 to 25% by weight of BaCO$_3$, 2 to 15% by weight of CaCO$_3$ and a total amount of at least one of Li$_2$CO$_3$, Na$_2$CO$_3$, MnCO$_3$ and MgCO$_3$ being 4 to 15% by weight. When an amount of BaCO$_3$ is less than 8% by weight, the bead configuration is convex, the removability of slag is inferior and the slag inclusion is caused. When the amount exceeds 25% by weight, the ripple pattern of the bead surface becomes rough and the slag is readily stuck and the undercut is apt to be formed. When CaCO$_3$ is less than 2% by weight, an amount of the diffusible hydrogen in the weld metal is increased and the hydrogen cracks are readily induced and the molten metal flow becomes unstable and weld defects such as irregular bead surface, undercut and slag inclusion are apt to be formed. When the amount exceeds 15% by weight, the removability of slag is deteriorated and the molten metal causes an excessive convection in weld puddle and the undercut and slag inclusion are caused. Li$_2$CO$_3$, Na$_2$CO$_3$, MnCO$_3$ and MgCO$_3$ are relatively low in the decomposition temperature for evolving CO$_2$ gas and the melting point so that the decomposed gas formed by the welding heat is gradually discharged at early stage and the molten metal flow and the arc phenomena are stabilized and therefore even if the height of the flux dispersed is varied, the good bead configuration is always obtained and the formation of the undercut and slag inclusion is considerably eliminated and the high speed welding is feasible. When the total amount of Li$_2$CO$_3$, Na$_2$CO$_3$, MnCO$_3$ and $MgCO_3$ is less than 4% by weight, the stable evolution of the gas does not occur and when the height of the flux dispersed is varied, there is fear that the undercut and slag inclusion are caused. When the amount exceeds 15% by weight, the melting point of the weld slag is too low and the ripple pattern of the weld bead becomes rough and in particular, the undercut is readily caused at the welding speed of more than 35 cm/min. When the welding speed is less than 35 cm/min, the welding is favorably carried out in the total amount of less than 20% by weight.

Figure 3:
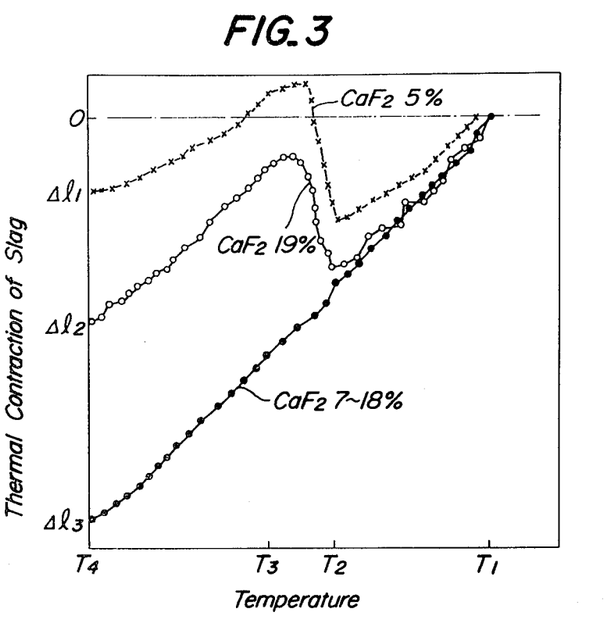
FIG. 3 is a graph illustrating the behavior of thermal contraction of the slags in the cooling process after solidification.

$CaF_2$ is a necessary fluorine source for composing barium mica and further has a great influence upon the volume expansion behavior of the weld slag in the cooling process after the solidification of the weld slag and the added amount is an important factor for improving the removability of the slag. That is, as shown in FIG. 3, in the course ($T_1 \rightarrow T_2 \rightarrow T_3 \rightarrow T_4$) of cooling after the solidification (at temperature $T_1$), when an amount of $CaF_2$ is less than 7% by weight and more than 18% by weight, the expansion due to the variation of the crystal structure occurs between the temperature $T_2$ and the temperature $T_3$ and the contraction of the slag at room temperature ($T_4$) are $\Delta l_2$ and $\Delta l_1$ respectively, while when the amount of $CaF_2$ is 7 to 18% by weight, there is no expansion between $T_2$ and $T_3$ and substantially uniform thermal contraction occurs from $T_1$ to $T_4$ and therefore the contraction at room temperature ($T_4$) is $\Delta l_3$, which is larger than $\Delta l_1$ and $\Delta l_2$ and this is the essential factor which considerably improve the removability of slag. Accordingly, $CaF_2$ is limited to 7 to 18%.

Figure 4:
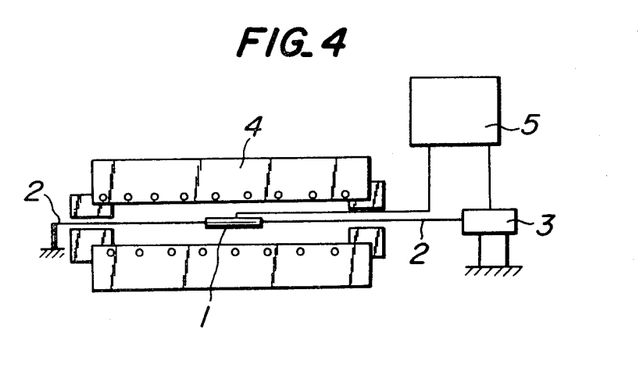
FIG. 4 is a diagrammatic view of an apparatus for measuring the thermal contraction behavior of the slag.

The data in FIG. 3 were obtained by the following method. The weld slag were remelted in a carbon crucible and rod-shaped samples having a diameter of 8 mm and a length of 50 mm were prepared and the lengths of said samples were measured by a thermal expansion measuring apparatus. The change in length of the sample 1 when it is cooled at a rate of about 5° C./min was measured through a quartz tube 2 by means of a displacement meter. In FIG. 4, 5 is a recorder.

The addition of metal powders aims the deoxidizing function, alloying or increase of the deposition rate and Si, Mn, Al, Ti, Zr, Mo, Ni, Fe and the like may be added alone or in alloyed metal powders. When the total amount of one or more of these metal powders is more than 20% by weight, the kneading ability of the flux is deteriorated and the inadequate distribution in size of flux powders causes unstable molten metal flow and the welding defects are caused, so that the metal powders are preferred to be less than 20% by weight.

Concerning the other flux components, metal oxides, such as $TiO_2$, $MnO$, $FeO$, $Fe_2O_3$, $Fe_3O_4$ and $ZrO_2$, and impurities may be mentioned but the total amount of these components is preferred to be less than 20% by weight. When the amount exceeds 20% by weight, the above mentioned effectiveness of the major components are lost and the removability of slag becomes inferior.

When a ratio of the total amount of the basic components of MgO, BaO, CaO and $CaF_2$ to the total amount of the acidic components of $SiO_2$, $Al_2O_3$, $TiO_2$, MnO and $ZrO_2$ is less than 2.3, a glassy slag is liable to be formed and the removability of slag is relatively good. But, the levels of oxygen and diffusible hydrogen in the weld metal become very high and the mechanical properties of the weld metal are deteriorated and the hydrogen cracks are readily induced and it is not desirable to apply such fluxes to the materials to which the high qualities are required, such as high strength steels, low alloy steels, heavy-thickness steels which need a large number of welding passes. When said ratio exceeds 4.5, the melting point of the slag is raised and the appearance of the bead surface is deteriorated and further the removability of slag becomes inferior and the welding defects are apt to be formed.

As mentioned above, the flux composition of the present invention has the remarkable effect for improving the removability of slag and preventing the formation of the welding defects, and enables the unique one pass-on layer submerged arc welding process in a narrow groove wherein a root gap is less than 25 mm, and attains the improvement of the welding productivity, the reduction of cost, the simplification of the welding operations and high quality of the welded joints. In this case, when the distance between the groove faces is larger than 25 mm, the wetness of the weld bead and both side walls is poor, and lack of fusion and slag inclusion are readily formed. When a narrow gap groove of less than 25 mm is deposited by one pass-one layer welding technique, sound side wall fusion can be satisfactorily accomplished and no welding defect is formed. When the distance is larger than 25 mm, multi pass-one layer technique is preferable in view of prevention of the welding defects.

BRIEF DESCRIPTION OF THE DRAWINGS

For a better understanding of the invention, reference is taken to the accompanying drawings, wherein.

DESCRIPTION OF THE PREFERRED EMBODIMENTS

The following examples are given for the purpose of illustration of this invention and are not intended as limitations thereof.

EXAMPLE 1

By using 16 kinds of bonded fluxes shown in the following Table 1, 14 layer welding by one pass-one layer technique was applied to 70 mm-thick ASTM A516 Gr. 70 steel plate (chemical components: C: 0.147%, Si: 0.25%, Mn: 1.22%, P: 0.015%, S: 0.003%, Ni: 0.19%) having a narrow groove shown in FIG. 5 wherein a root radius is 6 mm and a bevel angle is 4°. The used wire was KW-50C (C: 0.08%, Si: 0.35%, Mn: 1.50%, P: 0.013%, S: 0.005%, Mo: 0.50%) having a diameter of 3.2 mm or 4 mm.

TABLE 1

| | | Slag forming composition (%) | | | | | | Gas forming composition (%) | | | | | | |
|---|---|---|---|---|---|---|---|---|---|---|---|---|---|---|
| | | *2 MgO | *2 BaO | *2 CaO | $SiO_2$ | $Al_2O_3$ | $CaF_2$ | *3 $BaCO_3$ | *3 $CaCO_3$ | *3 $MgCO_3$ | $Li_2CO_3$ | $Na_2CO_3$ | $MnCO_3$ | Total |
| Present invention | F-1 | 24 | 14 | 3 | 10 | 8 | 18 | 18 | 4 | 3 | 1 | — | — | 26 |
| | 2 | 36 | 10 | 5 | 11 | 3 | 10 | 10 | 7 | 6 | — | — | — | 23 |
| | 3 | 21 | 13 | 10 | 13 | 5 | 13 | 17 | 15 | — | 3 | 1 | 1 | 37 |
| | 4 | 41 | 16 | 2 | 12 | 8 | 15 | 8 | 3 | — | — | — | — | 11 |
| | 5 | 24 | 18 | 9 | 15 | 3 | 18 | 10 | — | 1 | — | — | — | 11 |
| | 6 | 36 | 13 | 3 | 10 | 14 | 15 | 5 | 1 | — | 6 | — | — | 12 |
| | 7 | 34 | 7 | 9 | 12 | 5 | 10 | 6 | 13 | — | 10 | — | 4 | 33 |
| | 8 | 20 | 19 | 10 | 10 | 3 | 7 | 25 | 15 | 4 | 8 | 1 | 2 | 55 |
| | 9 | 27 | 20 | 8 | 16 | 3 | 8 | 25 | 15 | — | — | 2 | 3 | 45 |
| | 10 | 47 | 7 | — | 23 | 3 | 7 | — | 15 | — | — | — | — | 15 |
| | 11 | 34 | 7 | 9 | 12 | 5 | 10 | 6 | 12 | 8 | 4 | 5 | — | 35 |
| Comparative example | 12 | 20 | 20 | 12 | 18 | 10 | 10 | 10 | 10 | — | 4 | — | — | 20 |
| | 13 | 24 | 10 | 8 | 25 | 20 | 5 | 6 | 4 | 4 | — | — | — | 14 |
| | 14 | 20 | 21 | 10 | 3 | 12 | 20 | 20 | 18 | 4 | — | — | — | 42 |
| | 15 | 30 | 18 | 5 | 15 | 10 | 7 | 3 | 3 | — | — | — | — | 6 |
| | 16 | 10 | 5 | 8 | 18 | 7 | 5 | 4 | 20 | 15 | 15 | 6 | 2 | 62 |

| | | | Metal powder (%) | | Remainder (%) *4 | | *1 Basicity ratio |
|---|---|---|---|---|---|---|---|
| | | | Component | Total | Component | Total | |
| Present invention | F-1 | | Fe—Si / Mn | 4 / 2 | 6 | $TiO_2$ | 7 | 7 | 2.4 |
| | 2 | | — | 0 | $TiO_2$ / AlF | 12 / 5 | 17 | 2.3 |
| | 3 | | Fe—Si / Mn / iron powder | 2 / 1 / 5 | 8 | — | 0 | 3.2 |
| | 4 | | Fe—Si | 3 | 3 | — | 0 | 3.7 |
| | 5 | | Fe—Ti / Fe—Si | 2 / 1 | 3 | $TiO_2$ | 7 | 7 | 2.8 |
| | 6 | | Fe—Al / Al—Mg | 1 / 1 | 2 | — | 0 | 2.8 |
| | 7 | | — | 0 | MnO | 2 | 2 | 2.6 |
| | 8 | | Fe—Si / Fe—Mn / Fe—Al | 1 / 1 / 3 | 5 | — | 0 | 4.3 |
| | 9 | | — | 0 | — | 0 | 3.3 |
| | 10 | | Fe—Si / Fe—Mn / iron powder | 2 / 1 / 3 | 6 | — | 0 | 2.4 |
| | 11 | | — | 0 | — | 0 | 3.5 |
| Comparative example | 12 | | — | 0 | — | 0 | 2.2 |
| | 13 | | Fe—Si | 1 | 1 | $TiO_2$ | 2 | 2 | 1.0 |
| | 14 | | — | 0 | — | 0 | 4.7 |
| | 15 | | Fe—Si / Fe—Mn / Fe—Al | 3 / 5 / 3 | 11 | $TiO_2$ / MnO | 10 / 3 | 13 | 1.6 |
| | 16 | | Fe—Si / Mn | 3 / 3 | 6 | — | 0 | 1.1 |

*1: Basicity ratio was calculated from the formula
$$\frac{MgO + BaO + CaO + CaF_2}{SiO_2 + Al_2O_3 + TiO_2 + MnO + ZrO_2}$$

*2: These metal oxides include amounts obtained by calculating the metal carbonates in *3 as metal oxides.
*3: Intentionally added components. Impurity component is not contained.

The welding conditions and the welded results are shown in the following Table 2 and the fluxes F-1 to F-11 of the present invention were very excellent in the slag removability and the beads showed the concaved form and the side walls of the groove was satisfactorily fused and any defect was not found in a ultrasonic test and a radiographic test and the high quality welded joints were obtained. Particularly, the fluxes F-1 to F-3, F-6 to F-9 and F-11 can realize the sound welding performance at a high speed of about 35 to 50 cm/min as well as a low speed of about 10 to 25 cm/min and can be applied to multi-electrode welding.

TABLE 2

| | 3.2 mmφ, 550A-29V-23 cm/min *1 | | | 4.0 mmφ, 700A-35V-35 cm/min *2 | | |
|---|---|---|---|---|---|---|
| Flux No. | Slag removability | Under-cut | Slag inclusion | Slag removability | Under-cut | Slag inclusion |
| F-1 | ◎ | ◎ | ◎ | ◎ | ◎ | ◎ |
| 2 | ◎ | ◎ | ◎ | ◎ | ◎ | ◎ |
| 3 | ◎ | ◎ | ◎ | ◎ | ◎ | ◎ |
| 4 | ◎ | ◎ | ◎ | ○ | ○ | ◎ |
| 5 | ◎ | ◎ | ◎ | ○ | ○ | ◎ |
| 6 | ◎ | ◎ | ◎ | ◎ | ◎ | ◎ |
| 7 | ◎ | ◎ | ◎ | ◎ | ◎ | ◎ |
| 8 | ◎ | ◎ | ◎ | ◎ | ◎ | ◎ |
| 9 | ◎ | ◎ | ◎ | ◎ | ◎ | ◎ |
| 10 | ◎ | ○ | ◎ | ○ | ○ | ◎ |
| 11 | ◎ | ◎ | ○ | ○ | ○ | ○ |
| 12 | X | ○ | X | X | X | X |
| 13 | X | ○ | X | X | X | X |
| 14 | X | ○ | ○ | X | X | X |
| 15 | X | X | X | X | X | X |

TABLE 2-continued

| | 3.2 mmφ, 550A-29V-23 cm/min *1 | | | 4.0 mmφ, 700A-35V-35 cm/min *2 | | |
|---|---|---|---|---|---|---|
| Flux No. | Slag removability | Undercut | Slag inclusion | Slag removability | Undercut | Slag inclusion |
| 16 | X | X | X | X | X | X |

Note: ⊚: Very good ○: Good X: Poor
*1, *2: Height of flux dispersed is 45 mm.

EXAMPLE 2

Figure 5:
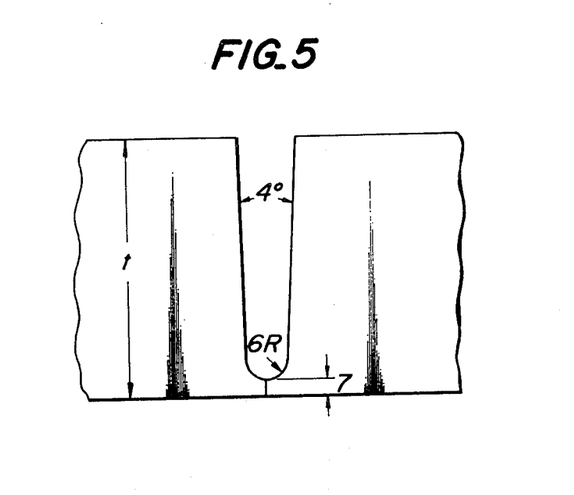
FIGS. 5 and 6 are cross-sectional views showing groove configurations used in Examples 1 and 2, and Examples 3, 4 and 5 respectively.

JIS SM-50A 50 mm-thick steel plates (chemical components, C: 0.18%, Si: 0.41%, Mn: 1.45%, P: 0.020%, S: 0.004%) having a groove as shown in FIG. 5, were welded by using a combination of a wire KW-30C (chemical components, C: 0.07%, Si: 0.35%, Mn: 1.50%, P: 0.015%, S: 0.005%) and a flux of F-1, F-6, F-7 or F-15 shown in Table 1 under the conditions of the following Table 3. In this case, the weldability was compared by varying the height of the flux dispersed from 25 mm to 65 mm and the obtained results are shown in the following Table 4.

TABLE 3

| Wire diameter (mm) | Wire angle (deg) | Wire extending length (mm) | Height of flux dispersed (mm) | Welding current (A) | Welding voltage (V) | Travel speed (cm/min) | Heat input (KJ/cm) |
|---|---|---|---|---|---|---|---|
| 4.0 | 0 | 50 | 25 to 65 | 550 | 29 | 25 | 38 |

TABLE 4

| Flux No. | Height of flux dispersed (mm) | | | | |
|---|---|---|---|---|---|
| | 25 | 35 | 45 | 55 | 65 |
| F-1 | Good | Good | Good | Good | Good |
| 6 | Good | Good | Good | Good | Good |
| 7 | Good | Good | Good | Good | Good |
| 15 | Undercut Slag removability is poor | Undercut Slag removability is poor | Slag removability is poor | Convex bead slag inclusion | Convex bead slag inclusion |

The fluxes F-1, F-6 and F-7 according to the present invention were good in the weldability even by varying the height of flux dispersed from 25 mm to 65 mm and the bead configuration was concave and no welding defects were found. However, in the flux F-15 of comparative example, when the height of flux dispersed was small, an arc blow was suddenly caused and therefore undercuts were observed and the slag removability was deteriorated. When the height of flux dispersed was large, the bead was convex and the fusion of the side walls was insufficient and the slag inclusion was induced.

EXAMPLE 3

Figure 6:
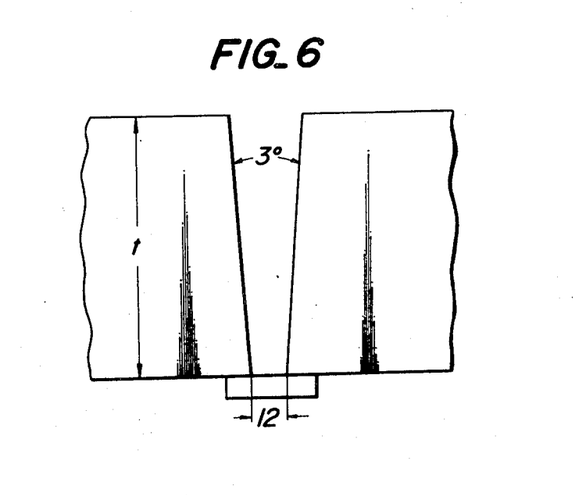

A groove portion having a root gap of 12 mm and a bevel angle of 3° as shown in FIG. 6 of 160 mm thick steel forgings ASTM A336 F-1 (chemical components, C: 0.25%, Si: 0.25%, Mn: 0.65%, P: 0.003%, S: 0.005%, Mo: 0.53%) was jointed by using a combination of the flux F-9 and a wire KW-50C having a diameter of 3.2 mm. The welding conditions were as follows. The first pass was 400 A, 27 V, and 16 cm/min and the second and all succeeding passes were 550 A, 30 V, 23 cm/min and the total welding was completed in 47 passes. The preheating temperature was 100° C. and the interpass temperature was lower than 150° C. The slag removability and the bead configuration in each pass were very good and any defect was not found in the ultrasonic test and the radiographic test. The performances of the weld joint were satisfactory in the strength, toughness, bend and ductility as shown in the following Table 5 and any variation of chemical compositions in weld metal through the full thickness was not recognized.

TABLE 5

| Heat-* treatment | Sampling position | Tensile test | | | | Side bend test | Impact test | | | Chemical compositions of weld metal (%) | | | |
|---|---|---|---|---|---|---|---|---|---|---|---|---|---|
| | | Yield strength (kg/mm²) | Tensile strength (kg/mm²) | Elongation (%) | Reduction in area (%) | | vE0 (kg · m) | vE-20 (kg · m) | vE-40 (kg · m) | C | Si | Mn | Mo |
| A | ¼t | 44.3 | 56.1 | 27 | 73 | Good | 15.7 | 12.8 | 9.3 | 0.05 | 0.37 | 1.54 | 0.51 |
| | ¾t | 46.0 | 58.5 | 27 | 72 | Good | 15.5 | 10.5 | 7.8 | 0.07 | 0.36 | 1.47 | 0.51 |
| B | ¼t | 41.9 | 54.8 | 26 | 70 | Good | 17.3 | 10.2 | 6.4 | | | | |
| | ¾t | 43.3 | 55.9 | 27 | 70 | Good | 15.7 | 9.9 | 6.8 | | | | |

*A: 650° C. × 5 Hr PWHT
B: 690° C. × 5 Hr PWHT

EXAMPLE 4

Figure 7:
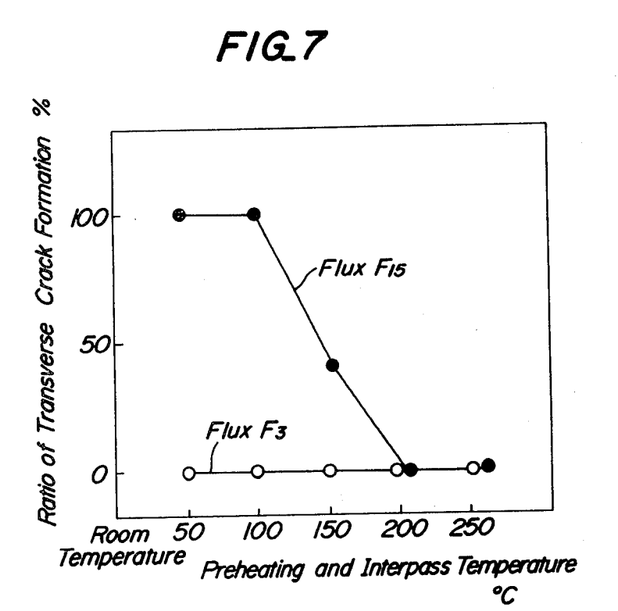
FIG. 7 is a graph showing the weld cracking test result in Example 4.

A groove having a root gap of 12 mm and a bevel angle of 3° in 75 mm thick steel plate ASTM A387 Gr 22 Cl 2 (chemical components, C: 0.13%, Si: 0.25%, Mn: 0.55%, P: 0.004%, S: 0.005%, Cr: 2.23% and Mo: 0.98%) was jointed by one pass-one layer welding technique with a single electrode by using a combination of the flux F-3 or F-15 in Table 1 and a wire KWT-210 (chemical components, C: 0.12%, Si: 0.15%, Mn: 0.65%, P: 0.004%, S: 0.003%, Cr: 2.45% and Mo: 1.0%) having a diameter of 4.0 mm. The welding conditions were 550 A, 28 V and 23 cm/min and the total welding was completed in 19 passes. By varying the interpass temperature from 50° C. to 250° C., the sensitivity to transverse crack was determined. In the weld joint deposited at the preheating and interpass temperature of 250° C., the mechanical properties of the weld metal was investigated and the obtained results are shown in FIG. 7 and Table 6.

TABLE 6

| Flux No. | Chemical compositions of weld metal (%) | | | | | | | | | Diffusible* hydrogen content |
|---|---|---|---|---|---|---|---|---|---|---|
| | C | Si | Mn | P | S | Cr | Mo | O | N | |
| F-3 | 0.09 | 0.21 | 0.73 | 0.008 | 0.006 | 2.28 | 1.0 | 0.0335 | 0.0043 | 0.75 |
| F-15 | 0.06 | 0.26 | 0.80 | 0.009 | 0.006 | 2.25 | 0.98 | 0.0588 | 0.0089 | 5.82 |

| Flux No. | Heat-** treatment | vE-40 (kg·m) | vTr40 (°C.) | Mechanical properties | | | |
|---|---|---|---|---|---|---|---|
| | | | | Room temperature (23° C.) | | 450° C. | |
| | | | | Tensile strength (kg/mm$^2$) | Elongation (%) | Tensile strength (kg/mm$^2$) | Elongation (%) |
| F-3 | 690° C. × 8 Hr | 7.8 | −51 | 63 | 25 | 49 | 20 |
| | 690° C. × 26 Hr | 9.4 | −58 | 59 | 28 | 47 | 23 |
| F-15 | 690° C. × 8 Hr | 2.0 | −20 | 58 | 19 | 45 | 19 |
| | 690° C. × 26 Hr | 3.5 | −28 | 56 | 21 | 41 | 18 |

*Unit of the diffusible hydrogen content is cc/100 g of deposited metal.
**Heating rate is 50° C./hr, Cooling rate is one at which the furnace is cooled (27° C./hr).

In the flux F-3 of the present invention, even in the preheating and interpass temperature being 50° C, no crack was formed, because the diffusible hydrogen level in the weld metal was considerably low. The mechanical properties were more excellent in all points than those of the flux F-15.

EXAMPLE 5

A groove having a bottom root gap of 12 mm and a bevel angle of 3° in high strength steel plates (chemical components, C: 0.09%, Si: 0.30%, Mn: 0.09%, P: 0.014%, S: 0.004%, Ni: 0.87%, Cr: 0.50% and Mo: 0.40%) having a tensile strength of 80 kg/mm$^2$ and a thickness of 40 mm, was deposited with one pass-one layer single electrode welding by using a combination of the flux F-1 in Table 1 and a wire KW-103B (chemical components, C: 0.05%, Si: 0.40%, Mn: 1.40%, P: 0.007%, S: 0.007%, Ni: 2.70%, Cr: 0.5% and Mo: 0.40%) having a diameter of 3.2 mm. The welding conditions were 600 A, 30 V and 30 cm/min and the joint was completed in 9 passes. The preheating and interpass temperature was 100° C. to 125° C.

The removal of the slag in any pass was very easy, the bead showed the good concave form, defects such as cold crack, hot crack, slag inclusion and the like were not induced. The toughness, vE-40 of the weld metal at the mid-thickness was 6.7 kg·m and no crack was formed in the side bend test and the tensile strength was 84.5 kg/mm$^2$. The sound weld joint having satisfactory qualities was obtained.

As mentioned above, according to the present invention, the working for removing the slag can be easily carried out and the molten metal flow in the weld puddle is stable and even if the height of flux dispersed is varied, the defects such as undercut, slag inclusion, lack of fusion and the like are not caused and the sound welded joints having a high quality can be obtained.

The fluxes of the present invention can apply to both one pass-one layer and multi-pass welding at groove of I-shape, X-shape, Y-shape, V-shape and other shapes in mild steel, high strength steel, low alloy steels and the like and this process is not limited to only one pass-one layer and can be used for multi-pass welding.

What is claimed is:

1. In basic bonded fluxes for submerged arc welding at a narrow groove consisting of a mixture of a slag forming composition, a gas forming composition and metal powders, the improvement comprising the slag forming composition consisting mainly of 5–20% by weight of BaO, not more than 10% by weight of CaO, 20 to 50% by weight of MgO, 6–25% by weight of SiO$_2$, 3–15% by weight of Al$_2$O$_z$ and 7–18% by weight of CaF$_2$, a value of basicity shown by a ratio of a basic component and an acidic component being 2.3 to 4.5, and the gas forming composition consisting of BaCO$_3$, CaCO$_3$ and MgCO$_3$, a total amount of which is 10–60% by weight, whereby a removability of slag at a narrow groove weld is improved.

2. The fluxes as claimed in claim 1, wherein the gas forming composition consists of 8 to 25% by weight of BaCO$_3$, 2 to 15% by weight of CaCO$_3$ and a total amount of at least one of Li$_2$CO$_3$, Na$_2$CO$_3$, MnCO$_3$ and MgCO$_3$ being 4 to 15% by weight.

* * * * *